United States Patent
Muller et al.

(10) Patent No.: US 9,344,157 B2
(45) Date of Patent: May 17, 2016

(54) METHOD AND APPARATUS FOR COMMUNICATION BY MEANS OF A TRANSFORMER

(75) Inventors: Alexander Muller, Sasbach-Jechtingen (DE); Martin Urban, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 14/117,733

(22) PCT Filed: Apr. 17, 2012

(86) PCT No.: PCT/EP2012/056969
§ 371 (c)(1),
(2), (4) Date: Nov. 14, 2013

(87) PCT Pub. No.: WO2012/156163
PCT Pub. Date: Nov. 22, 2012

(65) Prior Publication Data
US 2014/0093007 A1    Apr. 3, 2014

(30) Foreign Application Priority Data

May 19, 2011   (DE) .......................... 10 2011 076 135

(51) Int. Cl.
*H04B 5/00*   (2006.01)
*H04L 27/04*  (2006.01)
*G08C 19/06*  (2006.01)
*H04B 5/02*   (2006.01)

(52) U.S. Cl.
CPC .............. *H04B 5/0087* (2013.01); *G08C 19/06* (2013.01); *H04B 5/0093* (2013.01); *H04L 27/04* (2013.01); *H04B 5/00* (2013.01); *H04B 5/0031* (2013.01); *H04B 5/0037* (2013.01); *H04B 5/0043* (2013.01); *H04B 5/0062* (2013.01); *H04B 5/0075* (2013.01); *H04B 5/0081* (2013.01); *H04B 5/02* (2013.01)

(58) Field of Classification Search
CPC ...... H04B 5/0075; H04B 5/0081; H04B 5/00; H04B 5/0062; H04B 5/02
See application file for complete search history.

(56) References Cited

U.S. PATENT DOCUMENTS

| 4,255,812 A | 3/1981 | Huellwegen |
| 6,172,608 B1 * | 1/2001 | Cole .......................... 340/572.1 |

(Continued)

FOREIGN PATENT DOCUMENTS

| CN | 1762082 A | 4/2006 |
| CN | 101826972 A | 9/2010 |

(Continued)

OTHER PUBLICATIONS

"Near Field Communication (NFC) Safe and Convenient NFC Technology and Test", Heggenberger et al., Nov. 2012.*

(Continued)

*Primary Examiner* — Ross Varndell
(74) *Attorney, Agent, or Firm* — Bacon & Thomas, PLLC

(57) ABSTRACT

A method for communication by means of a transformer, which has at least a primary coil and a secondary coil, which are parts of an oscillatory circuit, wherein the oscillatory circuit is supplied on the primary side with an exciter frequency. For transmission of a signal from the secondary side to the primary side, the inductance of the secondary coil is modulated. A corresponding apparatus for performing the method is likewise provided.

10 Claims, 2 Drawing Sheets

(56) References Cited

U.S. PATENT DOCUMENTS

| | | |
|---|---|---|
| 7,492,247 B2 | 2/2009 | Schmidt |
| 8,531,153 B2 | 9/2013 | Baarman |
| 8,965,720 B2 | 2/2015 | Azancot |
| 2009/0001932 A1* | 1/2009 | Kamijo et al. .............. 320/108 |
| 2009/0146796 A1* | 6/2009 | Goto et al. ................. 340/10.51 |
| 2010/0015917 A1* | 1/2010 | Symons et al. ............. 455/41.1 |
| 2010/0308939 A1* | 12/2010 | Kurs ........................... 333/219.2 |
| 2012/0025623 A1* | 2/2012 | Low et al. .................... 307/104 |

FOREIGN PATENT DOCUMENTS

| | | |
|---|---|---|
| DE | 2826536 B1 | 7/1979 |
| DE | 19619311 A1 | 12/1996 |
| DE | 60212478 T2 | 2/2007 |
| EP | 2161806 A2 | 3/2010 |
| WO | 2008114268 A2 | 9/2008 |
| WO | 2010006091 A1 | 1/2010 |
| WO | 2012156163 A1 | 11/2012 |

OTHER PUBLICATIONS

Jun. 25, 2012 International Search Report, EPO, The Netherlands.
Nov. 28, 2013 English Translation of IPR, WIPO, Geneva, Switzerland.
Feb. 28, 2012 German Search Report, German Patent Office, Munich, Germany.
Jul. 2, 2012 International Search Report, EPO, The Netherlands.

\* cited by examiner

METHOD AND APPARATUS FOR COMMUNICATION BY MEANS OF A TRANSFORMER

TECHNICAL FIELD

The present invention relates to a method and apparatus for communication by means of a transformer, which has at least a primary coil and a secondary coil, which are parts of an oscillatory circuit, wherein the oscillatory circuit is supplied on the primary side with an exciter frequency. The apparatus is, for example, a capacitive, conductive, or vibronic, fill-level measuring device, especially an oscillatory fork, a temperature- and/or moisture or humidity sensor or a measuring device for determining pH-value, conductivity, or turbidity of a medium.

BACKGROUND DISCUSSION

For field devices of process automation for use in explosion endangered areas, an Ex-secure embodiment of power- and data transmission is of great importance. For this, the power transmission between the electronics unit and the sensor of a measuring device occurs frequently via a capacitive or inductive interface. For communication between the primary side and the secondary side, often Ex-secure optocouplers are used. These are, however, costly and require additional space in the electronics housing.

An alternative to optocouplers is to modulate the transmitted signals. For transmission of data from a primary side to a secondary side via a conductive or inductive interface, most often, the frequency of the signal is modulated. For this, a primary side electronics unit produces a signal with a first frequency or with a second frequency as a function of whether a logical zero or a logical one is to be transmitted. The signal serves simultaneously for energy transmission. For communication from the secondary side to the primary side, for example, the electrical current requirement of the secondary side is modulated. This form of energy- and data transmission is disclosed, for example, in Offenlegungsschrift DE 10 2006 051 900, A1.

A further method for communication from the secondary side to the primary side by means of amplitude modulation is described, for example, in Offenlegungsschrift WO 2008/135402 A1. The amplitude modulated signal is produced by a class-E amplifier. Amplitude shift keying in the output signal is achieved, in such case, either by varying the operating frequency of the class-E amplifier, or, in the case of constant operating frequency, by shifting the resonant frequency of the amplifier by means of an addable load.

Disadvantageous in the case of amplitude modulation is the relatively high disturbance susceptibility relative to in-coupled signals.

SUMMARY OF THE INVENTION

An object of the invention is to provide an apparatus and a method for disturbance resistant data transmission via an inductive interface.

The object is achieved by a method wherein, for transmission of a signal from the secondary side to the primary side, the inductance of the secondary coil is modulated.

On the primary side, a frequency change resulting from the modulation of the secondary inductance is evaluated. On the secondary side, respective inductance values are associated with logical zero or logical one as a function of the information to be transmitted. On the primary side, the corresponding binary digit is associated with the resonant frequency arising as a function of the respective inductance.

The method for signal transmission from the secondary side to the primary side represents an indirect frequency modulation. Indirectly, since the frequency is controlled not actively on the secondary side, but, instead, by changing a characteristic variable of the oscillatory circuit on the secondary side, which brings about a frequency change detectable on the primary side. This solution enables signal transmission with high efficiency. Energy and information are transmitted via the same interface.

Determining efficiency can serve furthermore for diagnostic purposes. If the efficiency is smaller than expected, or the resonant frequency does not correspond to the expected resonant frequency, a power loss is occurring at some location. Proceeding from the evaluation of efficiency, a warning signal can be produced for the operating personnel, so that, for example, maintenance can be initiated.

In a first embodiment of the solution of the invention, the inductance is modulated by varying the number of turns of the secondary coil.

In an embodiment of the method, for primary side evaluation of the signal, a modulation of the resonant frequency of the oscillatory circuit brought about by the modulation of the inductance is detected.

An embodiment associated therewith provides that the resonant frequency of the oscillatory circuit and/or a change of the resonant frequency of the oscillatory circuit are/is determined from the amplitude and/or the efficiency of the transformer.

In an advantageous embodiment of the method, for transmission of a second signal from the primary side to the secondary side, the exciter frequency is modulated. Frequency modulation represents a very disturbance resistant method of communication.

Another embodiment provides that communication phases are assigned to the secondary side, during which only the secondary side transmits data, and the oscillatory circuit is excited with the resonant frequency during the communication phases.

In a further development, the exciter frequency is controlled during the communication phases from the secondary unit to the primary unit in such a manner that the exciter frequency also in the case of a change of the secondary inductance always corresponds to the resonant frequency of the oscillatory circuit.

In a further development, the modulation of the inductance of the secondary coil is recognized and evaluated based on readjustment of the exciter frequency.

In an embodiment of the method, the secondary side communicates with the primary side independently of with which exciter frequency the oscillatory circuit is excited. In other words, the secondary side is not bound to its assigned communication phases, but, instead, can communicate with the primary side at any time.

An embodiment of the invention includes that frequency shift keying is implemented by means of the modulation of the secondary inductance.

The object is further achieved by an apparatus for communication by means of a transformer, which has a primary coil and a secondary coil, which are parts of an oscillatory circuit, a primary logic unit, which supplies the oscillatory circuit with an exciter frequency, and a secondary logic unit, wherein the secondary logic unit, for transmission of a signal from the secondary side to the primary side, modulates the inductance of the secondary coil.

In an advantageous embodiment of the apparatus, the secondary coil includes at least one connectable and disconnectable coil section and the secondary logic unit modulates the inductance by connecting and disconnecting the coil section.

The primary logic unit controls the excitation frequency of the oscillatory circuit and readjusts the excitation frequency in such a manner that it always corresponds to the resonant frequency, even when the resonant frequency changes due to a change of the secondary inductance. In this way, power transmission is optimized.

Such an apparatus is applied, for example, in a field device of process automation. The terminology, field device, is meant to include all types of measuring devices and actuators. Measuring devices serve for registering process variables and include, for example, fill level measuring devices, flow measuring devices, pressure- and temperature measuring devices, pH measuring devices, conductivity measuring devices, etc., which register the corresponding process variables, fill level, flow, pressure, temperature, pH-value, and conductivity, respectively. Actuators are used for influencing process variables, and include valves and pumps, via which e.g. the flow of a liquid in a pipeline or the fill level of a medium in a container is changed. In principle, the apparatus can be applied anywhere where energy and information are transmitted via a transformer.

BRIEF DESCRIPTION OF THE DRAWINGS

The invention will now be explained in greater detail as regards method, and apparatus for performing the method, based on the appended drawing. In the figures of the drawing, equal parts are provided with equal reference characters. The figures of the drawing show as follows.

DETAILED DISCUSSION IN CONJUNCTION WITH THE DRAWINGS

Figure 1:
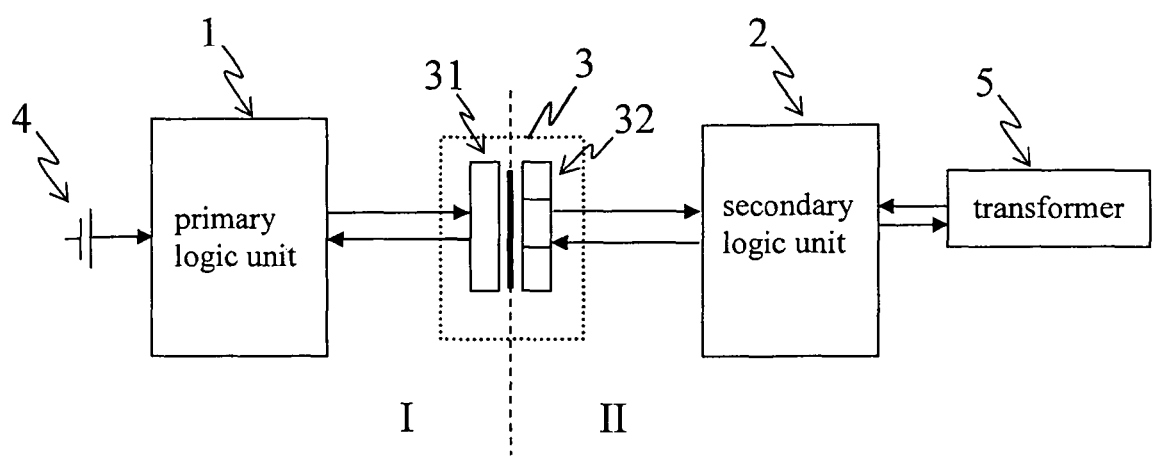
FIG. 1 is a block diagram of an apparatus having an inductive interface.

FIG. 1 shows a schematic, block diagram of an apparatus for communication and power transmission by means of a transformer 3. Transformer 3 forms the interface between a primary side I and a secondary side II. Primary side I has a voltage source 4. The secondary side II does not have its own energy source, but, instead, is supplied with energy from the primary side I. The energy consumer 5 on the secondary side II is, for example, a sensor for determining and/or monitoring one or more process variables. Primary side I and secondary side II possess logic units 1 and 2, respectively, which, among other things, control communication via the transformer 3. Via the transformer 3, which is constructed essentially of a primary coil 31 and a secondary coil 32, there occur energy- and signal transmission from the primary side I to the secondary side II and signal transmission from the secondary side II to the primary side I. Transformer 3 can, consequently, also be referred to as a transfer agent. In order to assure a sufficient energy supply to the components of the secondary side II, as well as a high efficiency for the apparatus, the signal transmission occurs by means of method, which has a high efficiency.

Figure 2A:
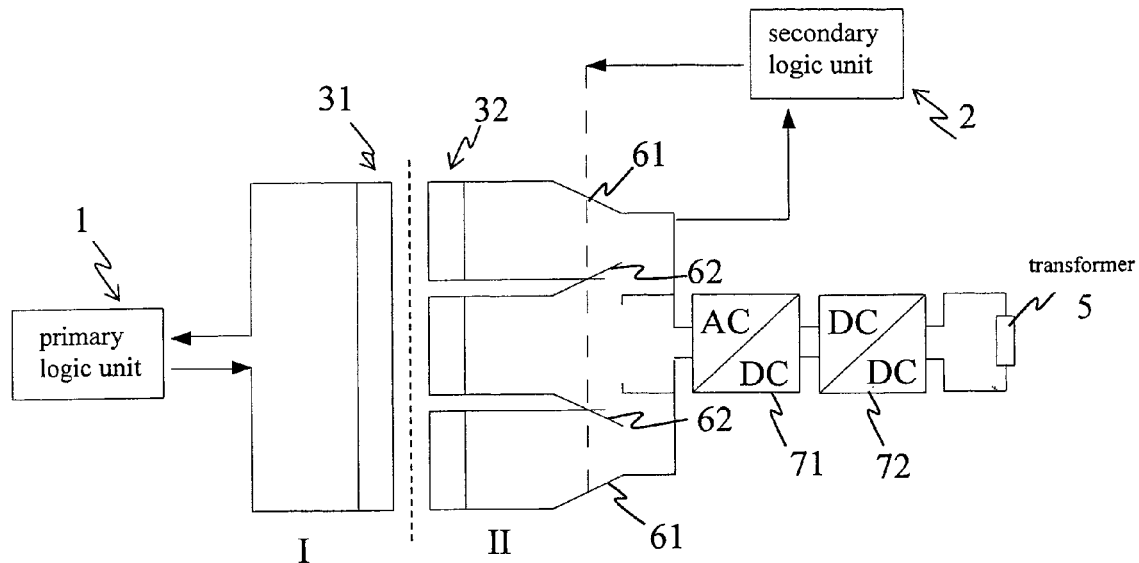
FIG. 2a is a first state of the apparatus during communication.
Figure 2B:
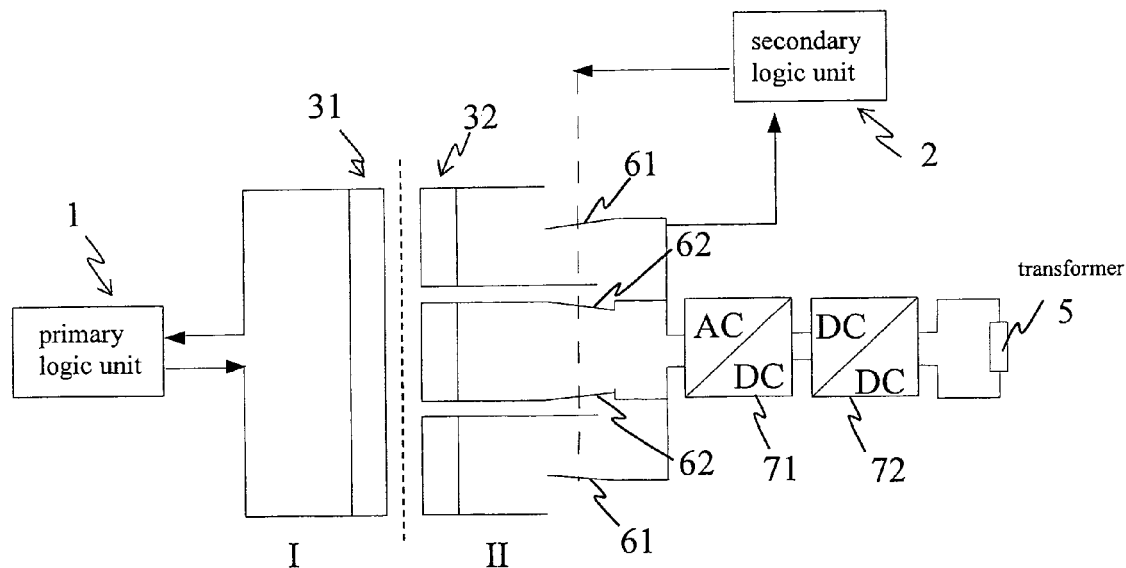
FIG. 2b is a second state of the apparatus during communication.

FIGS. 2a, and 2b, show the state of the apparatus in the case of transmission of a logical zero and the state of the apparatus in the case of transmission of a logical one, in each case from the secondary side II to the primary side I. For example, the state shown in FIG. 2a, corresponds to the base state or the transmission of a logical zero and the state shown in FIG. 2b, to the transmission of a logical one. The reversed arrangement is, however, likewise possible. Furthermore, the base state can be logical one instead of logical zero.

The primary coil 31 and the secondary coil 32 are parts of an oscillatory circuit, whose resonant frequency is essentially predetermined by the inductances of the two coils 31, 32. The setting of the excitation frequency of the oscillatory circuit occurs via the primary electronics unit 1. The secondary coil 32 is divided into three parts. If the two inner switch elements 62 are open such as in FIG. 2a, the three parts are connected with one another. The inductance of the secondary coil 32 is then determined by the totalled turns of all three parts. The two outer switch elements 61 connect the secondary coil 32 with a rectifier 71, which converts the transmitted alternating voltage into a direct voltage. Rectifier 71, in turn, is connected with a direct voltage converter 72, which supplies the consumer S with a constant voltage. Consumer 5, which is, for example, a sensor element, is schematically shown as a load resistor.

In FIG. 2b, the two outer switch elements 61 are open, while the two inner switch elements 62 are closed, i.e. they connect the central part of the secondary coil 32 with the rectifier 71. The inductance of the secondary coil 32 is determined in this state by the number of turns of the central part. Other parameters influencing inductance are constant.

The switch elements 61, 62 are controlled by the secondary electronics 2. The secondary electronics 2 also decodes the signals transmitted from the primary side I to the secondary side II and evaluates the transmitted information.

Communication from the primary side I to the secondary side II is preferably performed by means of frequency modulation. Frequency modulation methods enable an energy efficient data transmission. The two frequencies, which code the signal to be transmitted, are preferably so selected that they each deviate by a small amount from the resonant frequency of the oscillatory circuit and, thus, from the frequency, in the case of which maximum power transmission is possible. The first frequency is, for example, slightly smaller and the second frequency, by the same amount, slightly greater than the resonant frequency of the transformer. The terminology, slightly, means that the frequencies deviate only so far from the resonant frequency that the two frequencies are safely distinguishable from one another and from the resonant frequency, so that the power transmitted at the respective frequency is nevertheless transmitted with high efficiency. The encoding of the data to be transmitted with corresponding frequencies is performed by the primary logic unit 1. Alternatively to frequency modulation, communication from the primary side I to the secondary side II can occur by means of amplitude modulation.

For communication from the secondary side II to the primary side I, according to the invention, the secondary inductance is modulated. Furnished in the secondary electronics 2 is an association between the binary digit to be transmitted and the corresponding positions of the switch elements 61, 62. The inductance and, thus, the resonant frequency of the transformer are changed by means of the connecting and disconnecting of windings of the secondary coil 32 under the control of the secondary electronics 2. Such a change is detectable on the primary side I, for example, by measuring the resonant frequency of the oscillatory circuit, or by evaluating an automatic readjustment of the oscillatory circuit to the resonant frequency.

Communication from the secondary side II to the primary side I by means of modulation of the secondary inductance is not only disturbance resistant, but also, occurs with high efficiency. A device, especially a measuring device, in which is implemented the modulation of the secondary inductance together with a method having likewise a high efficiency for the data transmission from the primary side I to the secondary side II, possesses, consequently, the advantage that it can be operated with a small supply voltage.

Preferably, data transmission to the secondary side II and data transmission from the secondary side II do not occur simultaneously, but, instead, certain time intervals are reserved for communication from the secondary side II to the primary side I. These time intervals can be predetermined, for example, periodic, wherein their time separation relative to one another and their length are adaptable to the particular application. During these time intervals, the primary side I produces a signal with a frequency, which is different from the frequencies used for communication.

Preferably, the signal is produced with the resonant frequency, so that during these time intervals maximum power is transmitted to the secondary side II.

For decoding the signal on the primary side I, in an embodiment, the resonant frequency of the oscillatory circuit is determined and evaluated. The resonant frequency is uniquely associated with an inductance and, thus, with the information to be transmitted. For evaluating the communication signal, the primary logic unit 1 associates the two arising resonance frequencies with the respective binary digits, which they represent.

In an alternative embodiment, supplementally or alternatively to the resonant frequency, a change of the resonant frequency is detected and evaluated. For example, a resonant frequency is defined, in the case of which communication from the secondary side II to the primary side I occurs. This is associated with a binary digit. A increasing or decreasing of this preset resonant frequency is correspondingly associated with the complementary binary digit. A change of the resonant frequency is detectable, for example, via a change of the efficiency of the power transmission. The determining of efficiency offers, moreover, the opportunity for monitoring the interface. If efficiency falls unexpected strongly, this is an indication of the occurrence of a defect and an alarm signal can be produced for maintenance of the device. Especially in the case of process measuring devices, early defect detection is of high importance, since the failure of a process measuring device can have serious consequences, for example, in case subsequent valves or pumps are controlled based on its measurements.

In an embodiment, the excitation frequency of the oscillatory circuit in the case of a change of the resonant frequency is adjusted in such a manner that the current oscillation frequency of the oscillatory circuit again corresponds to the resonant frequency. The signal transmitted from the secondary side II is decodable based on the change of the resonant frequency.

The invention claimed is:

1. A method for communication and power transmission by means of a transformer, which has at least a primary coil and a secondary coil, which are parts of an oscillatory circuit, comprising the steps of:
supplying the oscillatory circuit on the primary side with an exciter frequency;
the energy and signal transmission from the primary side to the secondary side and signal transmission from the secondary side to the primary side occurs via the transformer, and
modulating an inductance of the secondary coil for transmission of a signal from the secondary side to the primary side, wherein:
communication phases are assigned to a secondary side (II) corresponding to the secondary coil, during which only the secondary side (II) transmits data, wherein the oscillatory circuit is excited with a resonant frequency during communication phases, and
the exciter frequency is controlled during communication phases from the secondary side (II) to a primary side (I) corresponding to the primary coil, in such a manner that the exciter frequency also in the case of a change of the secondary inductance always corresponds to the resonant frequency of the oscillatory circuit.

2. The method as claimed in claim 1, wherein:
the inductance is modulated by varying the number of turns of the secondary coil.

3. The method as claimed in claim 1, wherein:
for primary side receiving and evaluation of the signal, a modulation of a resonant frequency of the oscillatory circuit brought about by the modulation of the inductance is detected.

4. The method as claimed in claim 3, wherein:
the resonant frequency of the oscillatory circuit and/or a change of the resonant frequency of the oscillatory circuit are /is determined from the amplitude and/or the efficiency of the transformer.

5. The method as claimed in claim 1, wherein:
for transmission of a second signal from the primary side to the secondary side, the exciter frequency is modulated.

6. The method as claimed in claim 1, wherein:
the secondary side communicates with the primary side independently of with which exciter frequency the oscillatory circuit is excited.

7. The method as claimed in claim 1, wherein:
frequency shift keying is implemented by means of the modulation of the secondary inductance.

8. The method as claimed in claim 1, wherein:
the modulation of the inductance of the secondary coil is recognized and evaluated based on a readjustment of the exciter frequency.

9. An apparatus for communication and power transmission, comprising:
a transformer, comprising a primary coil and a secondary coil, which are parts of an oscillatory circuit;
a primary logic unit, which supplies the oscillatory circuit with an exciter frequency; and
a secondary logic unit, wherein:
the energy and signal transmission from the primary side to the secondary side and signal transmission from the secondary side to the primary side occurs via the transformer, and
said secondary logic unit, for transmission of a signal from the secondary side to the primary side, modulates an inductance of said secondary coil, wherein:
communication phases are assigned to a secondary side (II) corresponding to the secondary coil, during which only the secondary side (II) transmits data,
wherein the oscillatory circuit is excited with a resonant frequency during communication phases, and wherein
the exciter frequency is controlled during communication phases from the secondary side (II) to a primary side (I) corresponding to the primary coil, in such a manner that the exciter frequency also in the case of a change of the secondary inductance always corresponds to the resonant frequency of the oscillatory circuit.

10. The apparatus as claimed in claim 9, wherein:
said secondary coil comprises at least one connectable and disconnectable coil section; and
said secondary logic unit modulates the inductance by connecting and disconnecting the coil section.

\* \* \* \* \*